A. M. CRAIG.
SHOCK ABSORBER.
APPLICATION FILED OCT. 1, 1918.
1,384,238. Patented July 12, 1921.
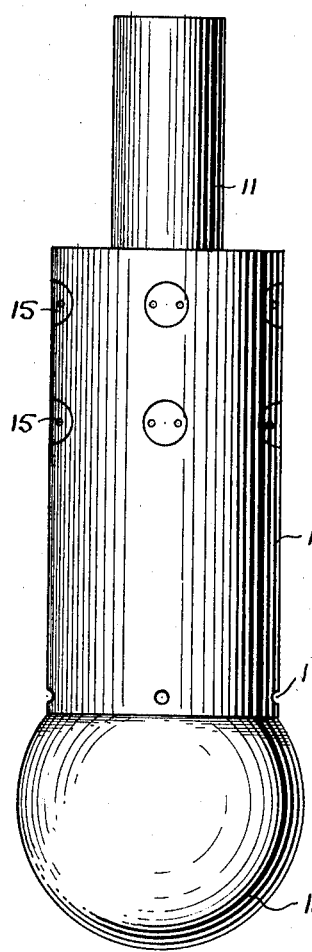
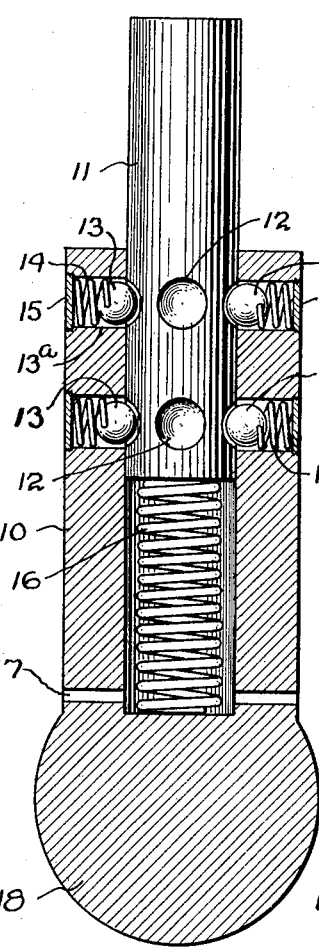
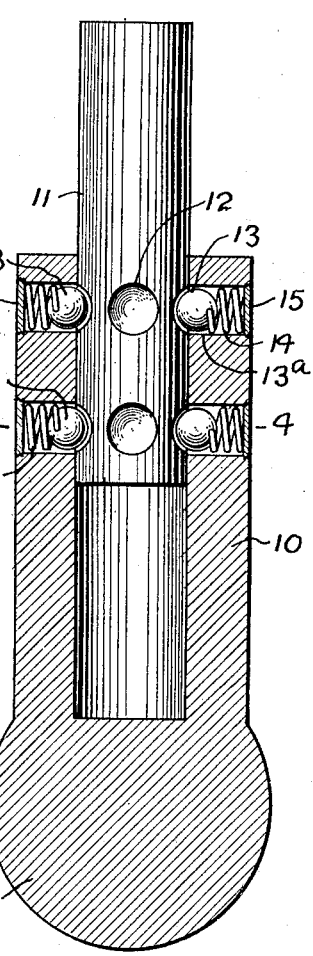
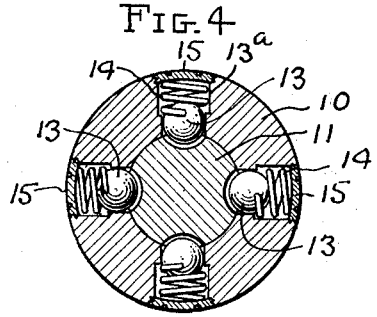
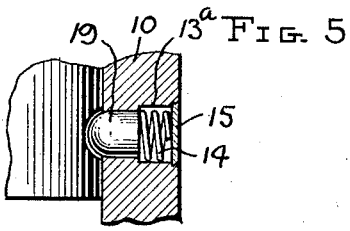
Alvin M. Craig, Inventor,
By his Attorney,
W. B. Hutchinson,

UNITED STATES PATENT OFFICE.

ALVIN M. CRAIG, OF NEW HAVEN, CONNECTICUT.

SHOCK-ABSORBER.

1,384,238.  Specification of Letters Patent.  Patented July 12, 1921.

Application filed October 1, 1918. Serial No. 256,368.

*To all whom it may concern:*

Be it known that I, ALVIN M. CRAIG, a citizen of the United States, and a resident of New Haven, county of New Haven and State of Connecticut, have invented a new and useful Improvement in Shock-Absorbers, of which the following is a full, clear, and exact description.

My invention relates to improvements in shock absorbers, and the general object of my invention is to produce a simple and efficient shock absorber which is applicable to a great many uses, such for instance as to support the body of an automobile or other vehicle, to absorb the shock of a gun recoil, or to absorb the shock or thrust of any mechanically moved member or thing. More particularly my invention comprises a sliding member or piston which moves in a tube and which has lateral cushions adapted to absorb moderate shocks and to permit comparatively slight longitudinal movements of said sliding member, and a main cushion behind the piston or sliding member adapted to absorb more violent shocks. This main cushion can be a spring, air, or other cushion as will appear from the description which follows. I prefer to support the tube and the sliding member which it carries in such a manner as to permit the apparatus as a whole to move into various angles or positions.

Reference is to be had to the accompanying drawings forming a part of this specification, in which similar reference characters indicate corresponding parts in all the views.

Figure 1 is a side elevation of one form of the shock absorber embodying my invention.

Fig. 2 is a longitudinal section of the same.

Fig. 3 is a view similar to Fig. 2 but showing a slight modification.

Fig. 4 is a cross section on the line 4—4 of Fig. 3, and

Fig. 5 is a detail showing a modification of one of the side or lateral cushions.

In my invention I employ a tube 10 which can be of any approved cross sectional shape, and in which fits a sliding member 11 in the nature of a piston which is adapted to carry a load or receive the thrust to be absorbed. Impinging on the sides of the sliding member or piston 11 is a lateral cushion, and I prefer to use a number of these cushions. In their preferred form these cushions comprise concave seats 12 in the member 11, and members 13 pressed into the seats. As shown these members 13 are balls, which structure I prefer, and they are pressed to their seats by springs 14 which are backed by nuts or equivalent abutments 15, the balls and springs being held in suitable recesses 13ª in the tube wall. It will be seen that when the piston or member 11 is moved longitudinally, the members 13 will roll or oscillate on their seats and permit an easy but limited movement of the member 11. When, however, the said member is subjected to a violent shock, the balls or members 13 leave their seats, and the shock which overcomes the pressure of the springs 14 is absorbed by the spring 16 which is arranged behind the member 11. I have shown the tube provided with vents 17 to permit the escape of air when the piston 11 is moved violently inward, but if desired the air vents may be omitted and the more violent thrust of the member 11 will be checked by the spring 16 and the additional air cushion formed by the confined air in the tube.

In the drawing I have shown four of the balls 13 in a series, and two series of the balls pressing against corresponding seats in the piston 11, but it will be understood that there can be a greater or less number of these balls in a series, and there can be any desired number of series or rows. It will further be seen that while the several balls 13 are shown as seating simultaneously in the several seats 12, this arrangement can be changed so that they will not all seat at the same time, if preferred.

In Fig. 5 I have shown a modification of the side cushion, in which the member 19 takes the place of the ball 13 and answers the same purpose, as its inner end is convex to fit the concave seat 12, and this member 19 is pressed to place by a spring 14 arranged in the recesses 13ª behind the member 19.

In Fig. 3 I have shown the tube 10 without a spring 16 and closed entirely at its inner end, in which case the member 11 relies on the air cushion as an additional shock absorber in conjunction with the balls 13 or equivalent side cushions as described.

Obviously the tube 10 can be supported in any convenient way, but I prefer to provide the closed end of the tube with a ball 18 which can be mounted in any ball-bearing casing to form a ball-joint so that the shock absorber as a whole can easily move to various angles so as to directly receive the thrust to be absorbed. Obviously other forms of joints can be used to accomplish the same result.

It will be noticed that in ordinary use and with variations of load or thrust, the member 11 will have a limited longitudinal and easily cushioned movement, the shock being absorbed by the springs 14 and the members 13 and 19, or equivalent members riding in the seats 12. When, however, the shock is more violent, the member 11 moves inward so that the members 13 leave their seats and the shock is taken up by the cushion behind the member 11, and on the rebound of the piston its outer movement is checked and limited by the several balls or equivalent devices which enter the appropriate seats in the member 11. Thus I get a very easy and variable cushion adapted to meet and absorb the various thrusts to which the apparatus may be subjected.

As used to absorb or diffuse all ordinary shocks the balls 13 are much preferable to any other form of device for diffusing the thrust, as these balls fit nicely in the seats 12 and under any usual shock the balls do not leave their seats, but spin in the seats, and it has been found that this spinning of the balls causes a great diffusion of the shock.

I claim:—

1. A shock absorber comprising a tube having recesses therein, a plunger movable longitudinally in the tube, said plunger having sockets in the sides thereof, and cushioned balls held in recesses in the tube and fitting in the aforesaid sockets.

2. A shock absorber comprising a tube having recesses therein, a plunger slidable in the tube and provided with concave sockets, a cushion behind the plunger, and cushioned balls held in the recesses of the tube and fitting in the aforesaid sockets and entering the sockets to such an extent that the balls will spin in their sockets under the movement of the plunger.

3. A shock absorber comprising a tube, a plunger movable longitudinally in the tube and provided with concaved sockets, and spring pressed balls held to move freely in the recesses of the tube and to fit in the sockets of the plunger.

4. A shock absorber comprising a tube having transverse recesses therein, a plunger movable longitudinally in the tube, and cushioned members held in the recesses of the tube and with their inner parts shaped to fit the sockets of the plunger.

ALVIN M. CRAIG.

Witnesses:
WARREN B. HUTCHINSON,
M. G. O'DONNELL.